United States Patent [19]
Chalfant

[11] Patent Number: 5,542,689
[45] Date of Patent: Aug. 6, 1996

[54] BICYCLE FRONT WHEEL DRIVE

[76] Inventor: Wayne C. Chalfant, 10680 Springcreek Rd., Piqua, Ohio 45356

[21] Appl. No.: 386,946

[22] Filed: Feb. 10, 1995

[51] Int. Cl.⁶ .................................................... B62M 1/14
[52] U.S. Cl. ...................... 280/242.1; 280/250; 280/233; 280/234
[58] Field of Search ................... 280/242.1, 244, 280/250, 233, 234, 252, 253

[56] References Cited

U.S. PATENT DOCUMENTS

| | | | |
|---|---|---|---|
| 534,537 | 2/1895 | Williams | 280/234 |
| 585,421 | 6/1897 | Bemis | 280/233 |
| 616,021 | 12/1898 | Schaibly | 280/233 |
| 4,147,370 | 4/1979 | Lindsey, Jr. | 280/233 |
| 4,925,200 | 5/1990 | Jones | 280/233 |
| 5,282,640 | 2/1994 | Lindsey | 280/233 |
| 5,308,097 | 5/1994 | Bono et al. | 280/233 |
| 5,328,195 | 6/1994 | Sommer et al. | 280/233 |

FOREIGN PATENT DOCUMENTS

| | | | |
|---|---|---|---|
| 777896 | 3/1935 | France | 280/242.1 |
| 782216 | 5/1935 | France . | |
| 173599 | 2/1935 | Switzerland . | |
| 500787 | 2/1939 | United Kingdom . | |
| 538877 | 8/1941 | United Kingdom | 280/242.1 |

*Primary Examiner*—Eric D. Culbreth
*Assistant Examiner*—F. Zeender
*Attorney, Agent, or Firm*—Richard C. Litman

[57] ABSTRACT

A front wheel drive system for a bicycle which can be installed on a bicycle to drive the front wheel by rocking the handlebars back and forth. A chain positioning and support mechanism is attached to the handlebar of a bicycle. The handle bar is attached to a rotatable outer sleeve of a handle bar stem. A rocker switch in the outer sleeve selectively locks the handle bar relative to the stem or allows the handle bar to rotate about the stem. A chain attached to the chain positioning and support mechanism engages a freewheel attached to the front hub of a bicycle and terminates in a spring connecting back to the chain positioning and support mechanism.

16 Claims, 6 Drawing Sheets

BICYCLE FRONT WHEEL DRIVE

BACKGROUND OF THE INVENTION

1. Field of the Invention

The present invention relates to a front wheel drive system for a bicycle.

2. Description of the Prior Art

Attempts have been made over the years to make bicycling more efficient. Only a fraction of the energy exerted by a bicyclist's upper body is transferred to the drive system of the bicycle being ridden. In particular, as a rider climbs a hill on a bicycle, the rider alternately pushes and pulls on the handlebars in conjunction with the pedal strokes to allow the rider to push harder on the pedals. Much of the energy developed in the arms and upper body of the rider, however, is dissipated into the handlebar and stem of the bicycle, and only a small portion of the energy expended aids in increasing the force applied through the rider's legs to the pedals.

Several attempts have been made to utilize the strength of the upper body to drive the front wheel of a bicycle or to increase the overall exercise benefits of cycling:

U.S. Pat. No. 585,421, issued to Bemis on Jun. 29, 1897, shows a front wheel drive system with rocking handlebars. The front hub is provided on both sides with clutch type-freewheels. Drive cables connected to the handlebars are wound around the clutches and are maintained taut by coil springs within the clutches. Guide pulleys are provided to guide the drive cables.

U.S. Pat. No. 616,021, issued to Schaibly on Dec. 13, 1898, shows a device for converting the rocking motion of the handlebars into a forward rotation of the front wheel. In the different embodiments, the left and right portions of the front drive system are interconnected so as to simultaneously push and pull a chain or belt connected to a directional pulley on the front wheel.

U.S. Pat. No. 4,147,370, issued to Lindsey, Jr. on Apr. 3, 1979, shows a variation of a front wheel drive system for a bicycle in which a multi-bar linkage uses a forward pivoting motion of the handlebar relative to the bicycle to drive a sprocket. The sprocket then drives a freewheel connected to the front wheel. U.S. Pat. No. 5,282,640 issued to Lindsey on Feb. 1, 1994 shows a similar front drive device.

U.S. Pat. No. 4,925,200, issued to Jones on May 15, 1990, shows a tricycle with an oscillating handlebar drive system. The right and left handlebars are connected to the right and left footrests, respectively. The back wheel is driven by alternate pushing of the right and left handlebars to pull a chain which drives the rear wheels of the tricycle. A spring resets the chain when pedal force is released.

U.S. Pat. No. 5,308,097, issued to Bono et al. on May 3, 1994, shows a front wheel drive system. A set of normally locked handlebars can be unlocked, which allows them to pivot about a point forward of the bicycle. A spring-loaded chain is alternately pushed and pulled by the rocking of the handlebars to drive a freewheel attached to the front wheel to provide for forward propulsion of the bicycle.

U.S. Pat. No. 5,328,195, issued to Sommer et al. on Jul. 12, 1994, shows a handlebar pivotally connected by a cable to a ratchet drive system. When the handlebar is lifted, the cable is pulled forward causing a drive pin to engage an auxiliary chaining to drive the rear wheel.

Swiss Patent 173,599, published on Feb. 16, 1935, shows a ratchet front wheel drive system for converting the pumping motion of the handlebars into a forward propulsion of the bicycle.

French Patent 782,216, published on May 31, 1935, shows several embodiments of a geared front wheel drive system for utilizing various handlebar motions to drive the front wheel.

British Patent 500,787, published on Feb. 15, 1939, shows a front wheel drive system for a bicycle, in which a single-cable drive system is used to convert the rocking motion of the handlebars into a forward revolution of the front wheel.

None of the above references, taken either singly or in any combination, is seen to describe the instant invention as claimed.

SUMMARY OF THE INVENTION

The present invention relates to an improved front wheel drive device for a bicycle which is reliable, adjustable, and light in weight. The drive system replaces several parts on a standard bicycle and converts the rocking or tilting motion of the handlebars to a motive force to drive the front wheel of the bicycle.

A modified front hub is provided on the drive system with a freewheel and integral cog attached to both sides of the hub. A chain guide plate having a surface made of a low friction, wear resistant material is mounted on each side of the front axle between the freewheel and the fork to prevent the chain from hitting the fork.

The drive system has at its center a handlebar stem which has an outer rotatable sleeve mounted on an interior shaft of the stem perpendicular to the steering axis. The interior shaft is connected to a substantially vertical portion of the stem, which in turn is mounted on a bicycle frame. The outer sleeve carries at an end opposite the vertical portion a standard handlebar for steering the bicycle. A rocker switch on the stem outer sleeve selectively allows the handlebar to either tilt back and forth or to lock the handlebar in a substantially horizontal position.

A chain is attached to each side of the handlebar by a chain support and positioning mechanism. Each chain connects between the chain support and a respective freewheel and terminates in a spring which is connected back to the chain support.

When a rider rocks the handlebars back and forth, the motion of the handlebar pulls one chain across the freewheel to drive the front wheel forward. Motion of the handlebar in the other direction releases tension on the chain allowing the spring to draw the chain back to its original position. The internal ratchet mechanism of the freewheel prevents a reverse torque from being applied to the front wheel as the freewheel turns backward as the chain draws back. The opposite side drive system has a reversed freewheel so that it will operate the same fashion except that it will drive the front wheel on the reverse stroke of the handle bar.

The chain positioning and support mechanism includes a plurality of fixing points for securing the chain at various distances from the stem. The radius of the chain from the stem determines the arc of travel of the chain during a "stroke" of the handle bars and thus the amount that the chain will travel during a stroke. The amount of travel of the chain will determine the number of rotations that the freewheel will make per stroke and thus the amount of work done by a stroke. Changing the position of the chain relative to the stem will determine the amount of work done by each stroke of the handle bars and thus the effort of a stroke.

Accordingly, it is a principal object of the invention to provide an upgrade for a bicycle which provides an auxiliary drive system to drive the front wheel of a bicycle.

It is another object of the invention to provide a front wheel drive system for a bicycle which has a variable ratio of freewheel rotations per handle bar stroke.

It is a further object of the invention to provide a front drive system with an improved chain guide to guide the chain and to prevent the chain from hitting against the front fork of the bicycle.

Still another object of the invention is to provide a light weight and reliable front drive system which can be turned off to selectively operate the bicycle in a standard mode or turned on to provide the bicycle with auxiliary front wheel drive.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an improved front wheel drive device which can be added to any bicycle to provide an auxiliary drive system. The drive system will be described with reference to the attached drawings.

Figure 1:
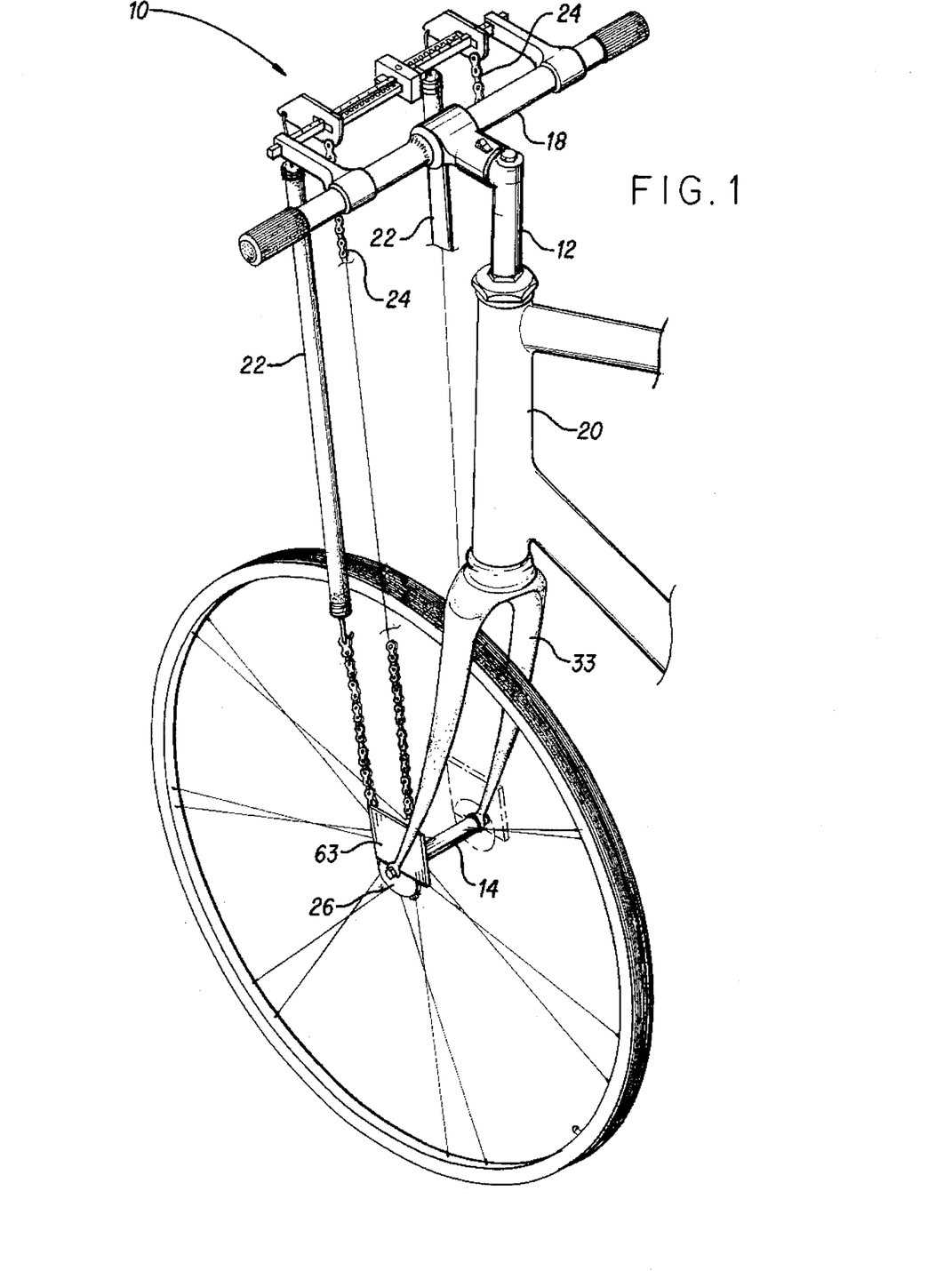
FIG. 1 is an environmental perspective of a front wheel drive system for a bicycle according to the present invention.

FIG. 1 shows the front wheel drive system 10 according to the present invention which can be mounted to a standard bicycle 20. A modified stem 12 and hub 14 replace the existing stem (not shown) and hub (not shown) of the bicycle 20.

Figure 3:
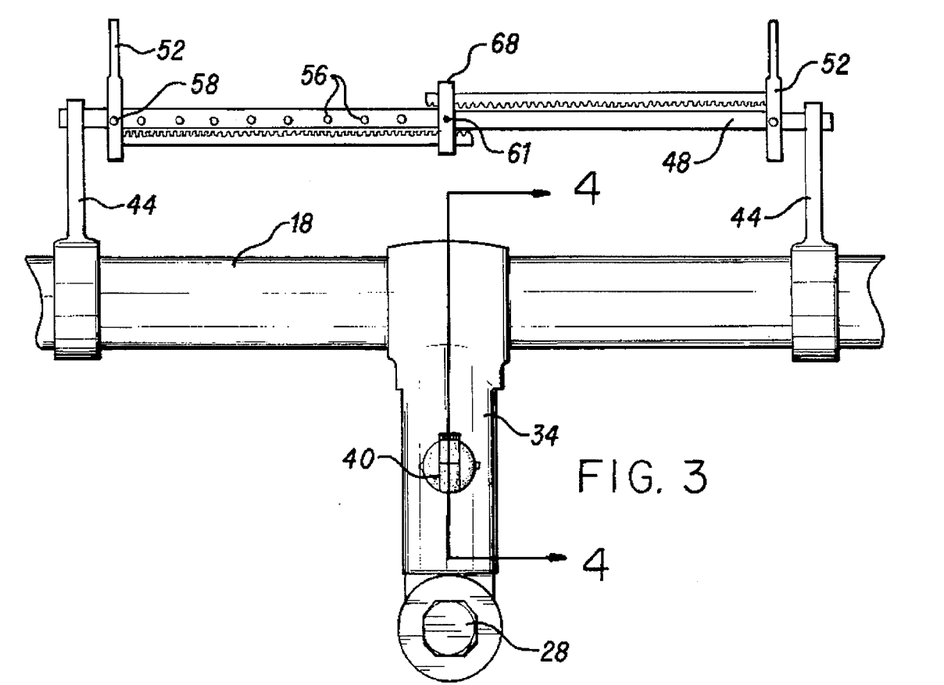
FIG. 3 is a top plan, exploded view of the drive system according to the present invention.
Figure 4:
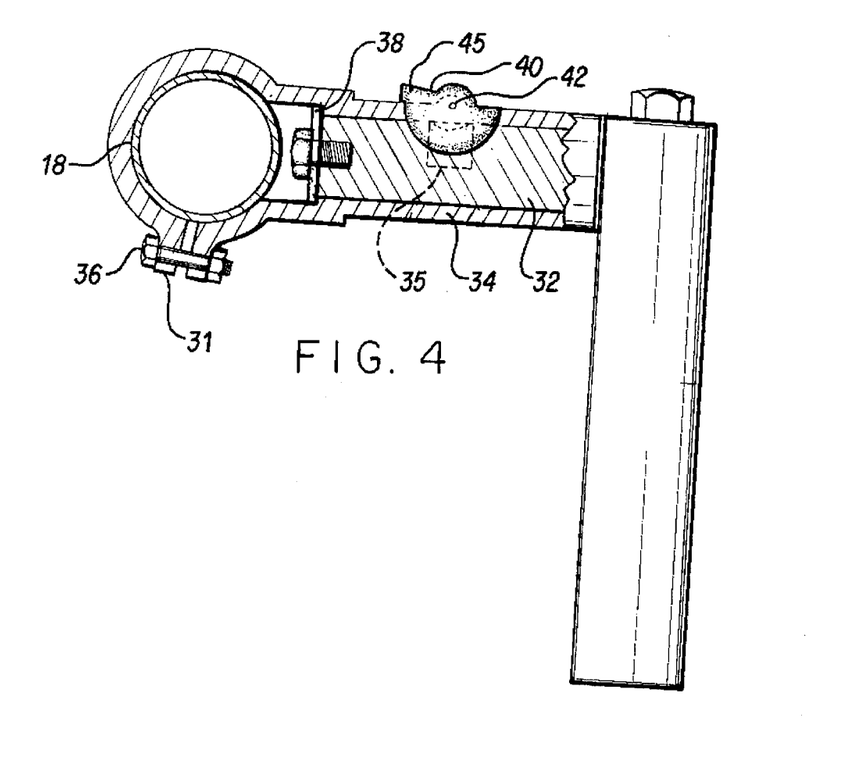
FIG. 4 is a cross-sectional view of the stem and handlebar of the front wheel drive system along lines 4—4 of FIG. 3.
Figure 5:
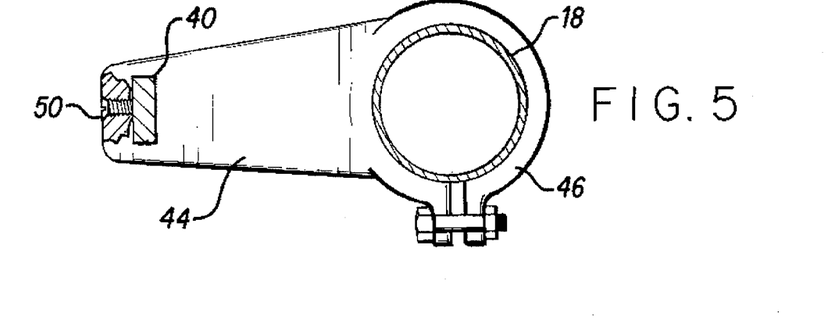
FIG. 5 is a side elevational view of the rail support with a front portion of the support broken away to show the rail fixing pin according to the present invention.

A handlebar stem 12 as best seen in FIGS. 1, 3, and 4 has a substantially vertical section which carries a fixing bolt in a central bore (not shown) of the stem. The fixing bolt 28 secures the stem in the fork 33 and frame 20 of the bicycle in a well known fashion to allow the stem 12 to rotate in conjunction with the fork 33 relative to the bicycle frame 20.

Figure 9:
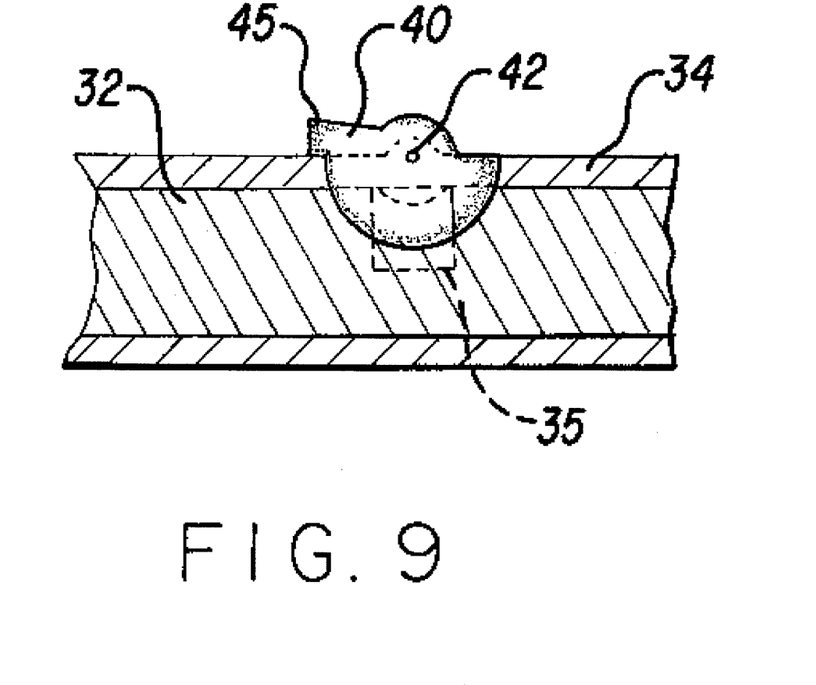
FIG. 9 is an exploded view of the rocker switch shown in a locked position.
Figure 10:
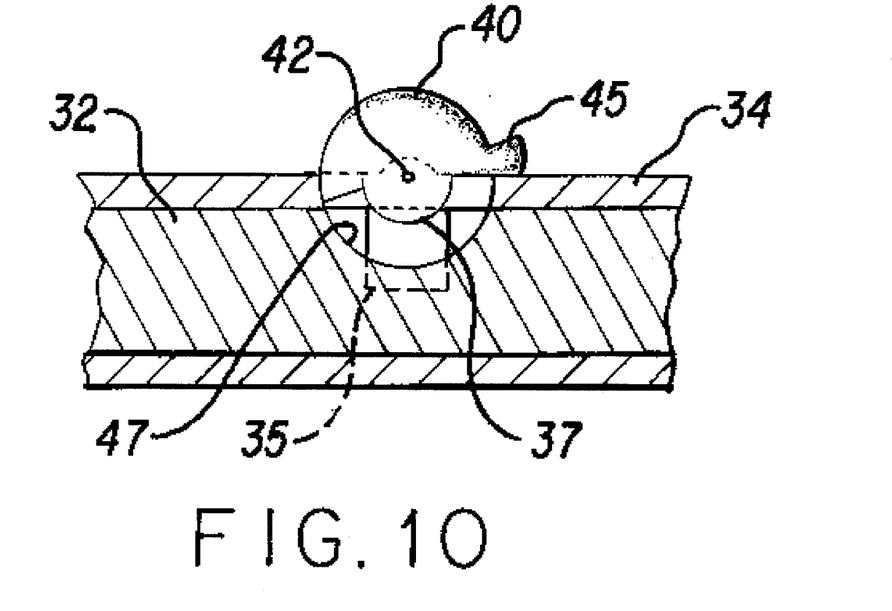
FIG. 10 is an exploded view of the rocker switch shown in an unlocked position.

The vertical section 30 of the stem attaches at its upper end to a cylindrical, horizontal inner shaft portion 32 perpendicular to the steering axis of the front wheel. An outer rotatable sleeve 34 coaxial with the inner shaft 32 rotates freely about the inner shaft 32. The outer sleeve 34 has a clamp 31 and cooperating clamp bolt 36 to secure a handle bar within the stem in a well known fashion. A fixing washer 38 affixed to the inner shaft by pin 39 prevents the axial movement of the outer sleeve 34 relative to the inner shaft 32. A rocker switch 40 as best shown in FIGS. 4, 9, and 10 is connected to the outer sleeve 34 by a pivot bolt 42 to selectively fix the outer sleeve 34 relative to the inner shaft 32 or allow the outer sleeve to rotate. The inner shaft 32 has grooves 35 to allow the rocker switch to rotate about the inner shaft.

When the rocker switch is in a first, locked position as shown in FIGS. 4 and 9, the body 40 of the rocker switch is engaged in the slot 47 (see FIG. 10) and the outer sleeve 34 is prevented from rotating about the inner shaft 32. When the rocker switch is rotated to a second, unlocked position as shown in FIG. 10, a reduced cross section key 37 of the rocker switch is exposed to the inner shaft 32. A tab 45 provided on the switch 40 engages the outer sleeve 34 to restrict the rotation of the rocker switch between the first and second position. The key 37 of the rocker switch rotates with the outer sleeve 34 about the inner shaft 32. A groove 35 provides a key way defining the range of motion of the key 37 and switch 40 about the inner shaft 32. While the groove 35 is shown to allow the stem to rotate 90° in either direction from the locked position, the groove may be shorter or longer so as to allow more or less motion.

As best seen in FIGS. 3 and 5–8, a chain positioning and support mechanism is attached to the handlebar. Rail supports 44 are clamped to the handlebar by clamps 46. The rail supports hold a rail 48 which is secured within the rail supports by screws 50. The rail carries two chain supports 52 which include rack portion 54. The rail 48 has a plurality of separated positioning holes 56 for receiving a positioning pin 58 to maintain the chain supports in the same position relative to the rail 48. The positioning pin 58 is inserted into a bore (not shown) in the chain support 52 and into the positioning hole 56 to prevent the chain support from sliding relative to the rail.

Figures 6, 7, 8:
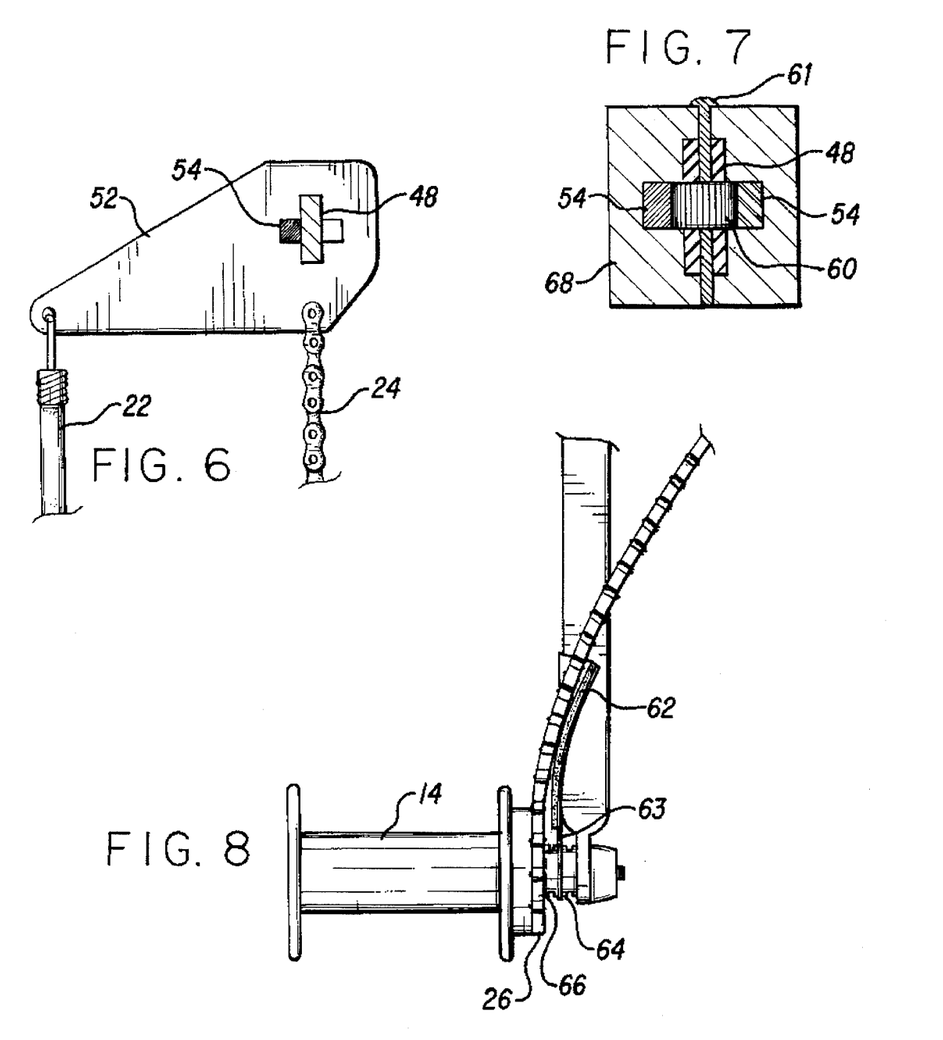
FIG. 6 is a side elevational view of the chain support of the front wheel drive system.
FIG. 7 is a cross-sectional view of the rail and pinion gear with the retaining pin removed.
FIG. 8 is a diagrammatic view of the front hub with one chain and chain guide shown installed on the hub.

Centrally located along the rail 48 is a pinion gear 60 (see FIG. 7). A pin 61 fixes the pinion gear in a bore in a central support 68 and allows the pinion gear to rotate relative to the rail 48. The pinion gear engages the gear teeth of both racks such that when one rack 54 is moved relative to the rail, the other rack 54 moves an equal distance in the opposite direction relative to the rail. The purpose of the rack and pinion is to maintain the chain supports at an equal, predetermined distance from the center of the rail. This distance will determine the arc of travel of the chain support during rotation of the handlebar.

Figure 2:
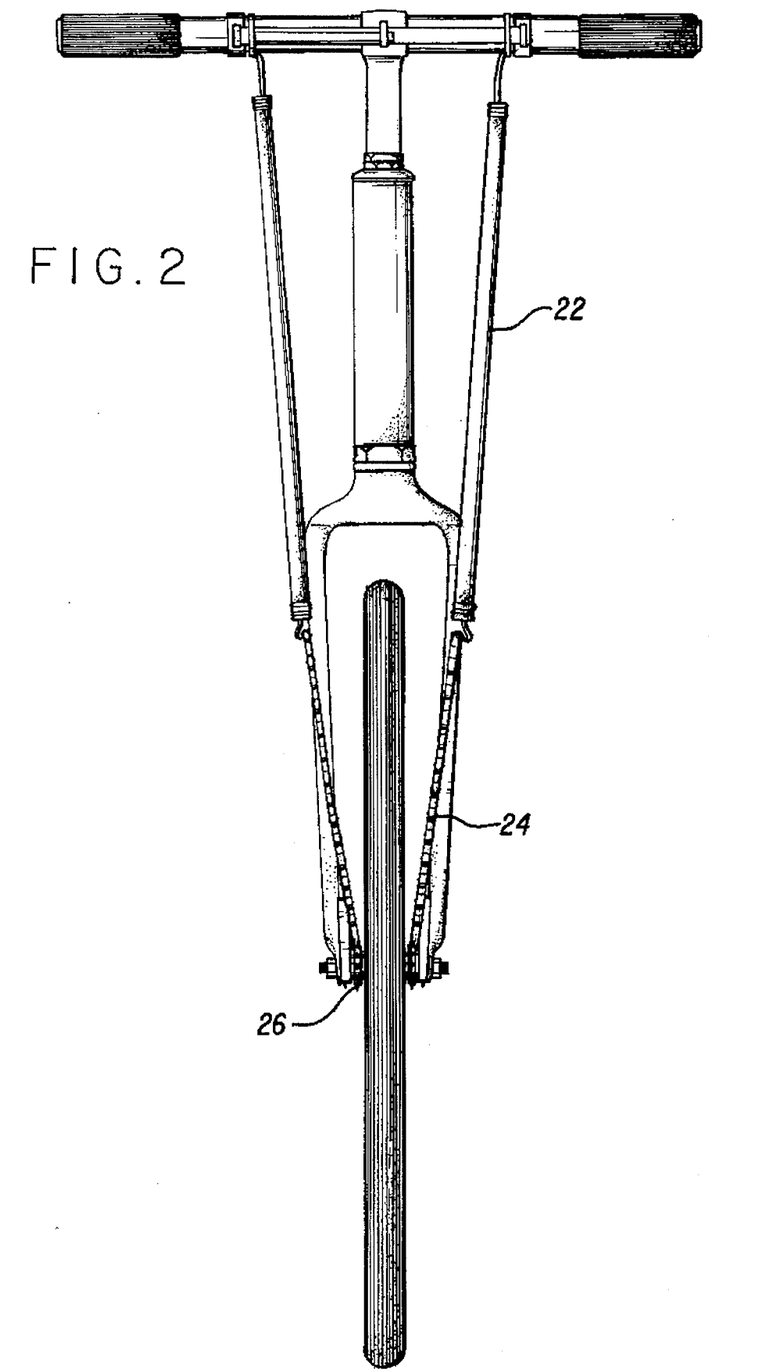
FIG. 2 is a front elevational, partial view of the front wheel drive system.

Attached to each chain support is a chain 24 and a spring 22. As best seen in FIGS. 1, 2, and 8, the chain 24 wraps around a freewheel 26 mounted on the front hub 14 and terminates in an end of the spring opposite the chain support 52. A chain guide 63 is mounted on the hub between two threaded spacers 64 and 66. The chain guide has a surface 62 made of a low friction, wear resistant material such as DELRYN or TEFLON. attached to an outer surface of the chain guide 63. The chain guide guides the chain to the freewheel and prevents the chain from contacting the front fork.

Operation of the drive system will be described with reference to one side of the drive system with the understanding that the opposite side is an exact mirror image of the first side, and will be in an opposite phase from the other side.

In operation, when the rocker switch is in the first position as shown in FIG. 9, the outer sleeve 34 of the stem 12 is fixed relative to the inner shaft 32. The handle bar 18 carried by the outer sleeve 34 cannot rotate relative to the stem 12, and the bicycle will operate in a normal fashion. When rocker switch is in the second position as shown in FIG. 10, the outer sleeve 34 and handle bar can rotate relative to the inner shaft 32 of the stem 12. When a first side of the handle bar rises in a first direction, the respective rail support will rise lifting the chain support and thus the chain. The movement of the chain will cause the freewheel to rotate and will stretch spring 22. If the front wheel is rotating slower than the freewheel, then the rotation of the freewheel will drive the front wheel. If the front wheel is rotating faster than the freewheel, then the rotation of the freewheel will have no impact on the front wheel.

When the first side of the handle bar falls in a second direction the spring will contract pulling the chain back to its original position, causing the freewheel to spin in the opposite direction. The internal ratchet mechanism well known in freewheels will allow the freewheel to turn backward but will not apply the reverse torque to the hub or wheel of the bicycle.

By using the positioning pin, the chain supports may be located at a greater or lesser distance from the center of the rail, the amount of chain travel in each handle bar "stroke" can be controlled. If the chain supports are near the center of the rail, the chain support travel and thus the chain travel will be less than if the chain supports are near the rail supports for a similar handle bar stroke. This positioning feature replaces the multiple gear ratios devices necessary on the rear gears. The rider can determine how much power will be applied to the front wheel for each stroke of the handle bars.

Figure 11:
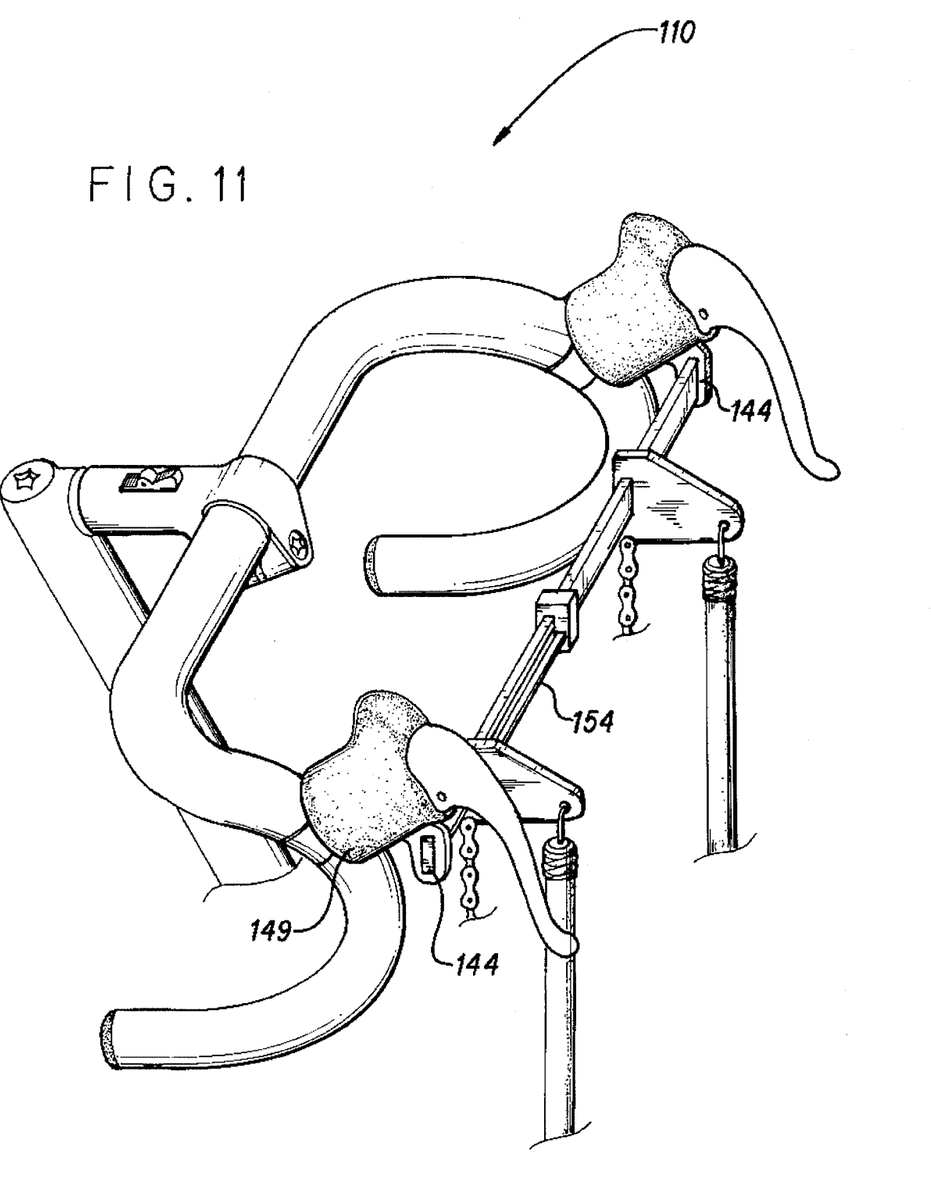
FIG. 11 is a perspective view of an alternate embodiment of the invention shown for use with a road bicycle.

FIG. 11 shows an alternate embodiment of the invention with mounts for use on a bicycle with drop bars or road style handlebars. The front wheel drive system 110 has modified rail supports 144 which connect to or are made integral with brake lever supports 149 instead of connecting directly to the handlebar. The rail supports 144 properly position the rails 154 of the front wheel drive system 110 to center the system over the front wheel. Operation of the front wheel drive system 110 is otherwise identical to the operation of the front wheel drive system 110.

Accordingly, it is to be understood that the present invention is not limited to the sole embodiment described above, but encompasses any and all embodiments within the scope of the following claims.

I claim:

1. A front wheel drive system for a bicycle having a front wheel, fork, frame, and rear wheel, comprising:

a hub rotatably attached to the fork of the bicycle including a first and second freewheel and an axle;

a stem attached to a steerer tube of the fork and rotatably attached to the frame of the bicycle and including an inner shaft and an outer sleeve;

said outer sleeve being rotatably attached to said inner shaft of said stem, and including a first end and an outer wall;

a handlebar attached to a clamp integral with said first end of said outer sleeve;

a chain positioning and support mechanism attached to said handlebar;

a first and second chain attached to said chain positioning and support mechanism;

said chain positioning and support mechanism including:
   positioning means to position each of said first and second chains at a predetermined distance from said stem;

a first and second rail support attached to said handlebar;

a rail attached to said first and second rail supports; and a first and second chain support attached to said rail, each of said first and second chain supports having a front and a rear end;

wherein said first and second chains are attached respectively to said chain positioning and support mechanism at said rear end of said first and second chain supports;

a first and second spring attached to said chain positioning and support mechanism, said first and second springs being attached respectively to said chain positioning and support mechanism at said front end of said first and second chain supports; and said first and second chains engaging said first and second freewheels and attaching respectively to said first and second springs, respectively;

whereby when said handle bar is rotated said first chain is lifted causing said first chain to rotate said first freewheel which rotates said hub and the front wheel of the bicycle, while said second spring is contracted drawing said second chain around said second freewheel which spins in a direction opposite said hub rotation and maintains the tension of said second chain on said freewheel.

2. The front wheel drive system according to claim 1, wherein said chain support and positioning mechanism position means further includes:

a positioning pin for releasably securing said first chain support in a respective positioning hole in said rail;

said pin being removably inserted into said bore of said first chain support and into said respective positioning hole of said rail to releasably locate said chain supports at a predetermined distance from said stem;

said first and second chain supports further including a rack having a plurality of teeth;

a central support attached to said rail including a pinion gear, said pinion gear engaging said plurality of teeth on said rack on each of said first and second chain supports;

said rail further including a plurality of spaced apart positioning holes; whereby said first and second racks and said pinion gears cooperate to position said first and second chain supports a substantially equal distance from said stem.

3. The front wheel drive system according to claim 1, further comprising a first and second chain guide attached to said hub.

4. The front wheel drive system according to claim 3, wherein each of said first and second chain guides include a surface made of a low friction, wear resistant material.

5. The front wheel drive system according to claim 4, wherein each of said first and second chain guides include a surface manufactured from a high impact synthetic material.

6. The front wheel drive system according to claim 4, wherein each of said first and second chain guides include a surface manufactured from polytetrafluoroethylene.

7. The front wheel drive system according to claim 3, further comprising:
   a first and second pair of threaded spacers on said hub;
   wherein said first and second chain guides are clamped between a respective pair of said first and second pairs of threaded spacers on said axle of said hub.

8. The front wheel drive system according to claim 1, further comprising a locking means to selectively nonrotatably lock said outer sleeve relative to said inner shaft.

9. The front wheel drive system according to claim 8, wherein said locking means is pivotally mounted on said outer sleeve.

10. The front wheel drive system according to claim 1, further comprising:
   a rocker switch pivotally attached to said outer stem outer wall and including a rocker switch body;
   said inner shaft further including means defining a slot and means defining a circumferential groove to accommodate said rocker switch;
   said rocker being moveable between a locked position wherein said rocker switch body is engaged with said slot and an unlocked position wherein said rocker switch body is disengaged with said slot; whereby
   when said rocker switch is in said locked position, said handle bar carried by said outer sleeve is fixed relative said stem, and when said rocker switch is in said unlocked position, said handle bar can rotate relative to said stem such that when said handle bar is rotated, said first chain support is lifted raising said chain thereby rotating said freewheel, said hub, and the front wheel of the bicycle while said second spring is contracted maintaining the tension of said chain on said freewheel and drawing said chain around said freewheel which spins freely opposite said hub rotation.

11. A front wheel drive system for a bicycle having a front wheel, fork, frame, and rear wheel, comprising:
   a hub attached to the fork of the bicycle including a first and second freewheel;
   a first and second chain guide attached to said hub;
   each of said first and second chain guides including a surface made of a low friction, wear resistant material;
   a stem attached to a steerer tube of the fork and rotatably attached to the frame of the bicycle and including an inner shaft and an outer sleeve;
   said inner shaft including means defining a circumferential groove and means defining a slot;
   said outer sleeve being rotatably attached to said inner shaft of said stem and including a first end and an outer wall;
   a rocker switch pivotally attached to said outer stem outer wall and including a rocker switch body;
   said rocker being moveable between a locked position wherein said rocker switch body is engaged with said slot and an unlocked position wherein said rocker switch body is disengaged with said slot;
   a handlebar attached to a clamp integral with said first end of said outer sleeve;
   a first and second rail support attached to said handlebar;
   a rail attached to said first and second rail supports including a plurality of spaced apart positioning holes;
   a first and second chain support attached to said rail;
   each of said first and second chain supports including a front end and a rear end, a bore, and a rack having a plurality of teeth;
   a positioning pin for releasably securing said first chain support in a respective positioning hole in said rail;
   a central support attached to said rail including a pinion gear, said pinion gear engaging said plurality of teeth on said rack on each of said first and second chain supports;
   a first and second chain attached respectively to said rear end of said first and second chain supports;
   a first and second spring attached respectively to said front end of said first and second chain supports; and
   said first and second chains engaging respectively said first and second freewheel and attaching to said first and second springs;
   wherein when said rocker switch is in said locked position, said handle bar is fixed relative to said stem; and when said rocker switch is in said unlocked position, said handle bar can rotate relative to said stem such that when said handle bar is rotated said first chain support is lifted raising said first chain which rotates said freewheel which rotates said hub and the front wheel of the bicycle while said second spring is contracted drawing said second chain around said second freewheel which spins in a direction opposite said hub rotation and maintaining the tension of said second chain on said freewheel.

12. A dual drive bicycle comprising:
   a frame;
   a fork rotatably mounted in said frame;
   a front wheel including a hub;
   said hub rotatably attached to said fork of said bicycle including a first and second freewheel and an axle;
   a stem attached to a steerer tube of said fork and rotatably attached to said frame of said bicycle and including an inner shaft and an outer sleeve;
   said outer sleeve being rotatably attached to said inner shaft of said stem, and including a first end and an outer wall;
   a handlebar attached to a clamp integral with said first end of said outer sleeve;
   a chain positioning and support mechanism attached to said handlebar;
   a first and second chain attached to said chain positioning and support mechanism;
   said chain positioning and support mechanism including:
      positioning means to position each of said first and second chains at a predetermined distance from said stem;
      a first and second rail support attached to said handlebar;
      a rail attached to said first and second rail supports; and
      a first and second chain support attached to said rail, each of said first and second chain supports including a front end and a rear end;
   said first and second chains being attached respectively to said chain positioning and support mechanism at said rear end of said first and second chain supports; and
   a first and second spring attached to said chain positioning and support mechanism, said first and second springs being attached respectively to said chain positioning and support mechanism at said front end of said first and second chain supports;

said first and second chains engaging said first and second freewheels and attaching to said first and second springs, respectively, and being attached respectively to said chain positioning and support mechanism at said rear end of said first and second chain supports;

whereby when said handle bar is rotated said first chain is lifted causing said first chain to rotate said first freewheel which rotates said hub and said front wheel of said bicycle, while said second spring is contracted drawing said second chain around said second freewheel which spins in a direction opposite said hub rotation and maintains the tension of said second chain on said freewheel.

13. The front wheel drive system according to claim 12, wherein said chain support and positioning mechanism position means further includes:

a positioning pin for releasably securing said first chain support in a respective positioning hole in said rail;

said pin being removably inserted into said bore of said first chain support and into a respective said positioning holes of rail to releasably locate said chain supports a predetermined distance from said stem;

said first and second chain supports further including a rack having a plurality of teeth;

a central support attached to said rail including a pinion gear, said pinion gear engaging said plurality of teeth on said rack on each of said first and second chain supports;

said rail further including a plurality of spaced apart positioning holes; whereby said first and second racks and said pinion gears cooperate to position said first and second chain supports a substantially equal distance from said stem.

14. The front wheel drive system according to claim 13, further comprising a first and second chain guide attached to said hub wherein each of said first and second chain guides include a surface made of a low friction, wear resistant material.

15. The front wheel drive system according to claim 14, further comprising a locking means to selectively nonrotatably lock said outer sleeve relative to said inner shaft.

16. The front wheel drive system according to claim 14, further comprising:

a rocker switch pivotally attached to said outer stem outer wall and including a rocker switch body;

said inner shaft further including means defining a slot and means defining a circumferential groove to accommodate said rocker switch;

said rocker being moveable between a locked position wherein said rocker switch body is engaged with said slot and an unlocked position wherein said rocker switch body is disengaged with said slot; whereby when said rocker switch is in said locked position, said handle bar carried by said outer sleeve is fixed relative to said stem, and when said rocker switch is in said unlocked position, said handle bar can rotate relative to said stem such that when said handle bar is rotated, said first chain support is lifted raising said chain thereby rotating said freewheel, said hub, and the front wheel of the bicycle while said second spring is contracted maintaining the tension of said chain on said freewheel and drawing said chain around said freewheel which spins freely opposite said hub rotation.

* * * * *